US009674306B2

(12) United States Patent
Lee et al.

(10) Patent No.: US 9,674,306 B2
(45) Date of Patent: Jun. 6, 2017

(54) METHOD AND SYSTEM FOR COMMUNICATING FROM A CLIENT DEVICE TO A SERVER DEVICE IN A CENTRALIZED CONTENT DISTRIBUTION SYSTEM

(71) Applicant: The DIRECTV Group, Inc., El Segundo, CA (US)

(72) Inventors: Sean S. Lee, Potomac, MD (US); Phillip T. Wang, Rockville, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 495 days.

(21) Appl. No.: 14/137,237

(22) Filed: Dec. 20, 2013

(65) Prior Publication Data
US 2015/0181002 A1   Jun. 25, 2015

(51) Int. Cl.
*H04N 21/239* (2011.01)
*H04N 21/472* (2011.01)
(Continued)

(52) U.S. Cl.
CPC .......... *H04L 67/42* (2013.01); *H04N 21/233* (2013.01); *H04N 21/2393* (2013.01);
(Continued)

(58) Field of Classification Search
CPC ... H04N 21/00–21/64792; H04L 67/00–67/42; H04L 65/00–65/80
See application file for complete search history.

(56) References Cited

U.S. PATENT DOCUMENTS

2004/0093389 A1\* 5/2004 Mohamed ........... H04L 67/1097
709/212
2005/0132420 A1   6/2005 Howard et al.
(Continued)

FOREIGN PATENT DOCUMENTS

EP   2340878 A2   7/2011
EP   2713366 A1   4/2014

OTHER PUBLICATIONS

International Search Report and Written Opinion dated Feb. 23, 2015 in International Application No. PCT/US2014/066194 filed Nov. 18, 2014 by Sean S. Lee et al.

*Primary Examiner* — Nicholas Taylor
*Assistant Examiner* — Clayton R Williams
(74) *Attorney, Agent, or Firm* — Harness, Dickey & Pierce, PLC

(57) ABSTRACT

A system for controlling a communication system includes a local area network, a client device and a server device in communication with the client device through the local area network. The server device communicates an audio-video stream and a remote user interface to the client device through the local area network. The client receives an input signal and communicates an allocate memory signal requesting the server device to allocate memory in response to the input signal. The server device allocates memory for receiving data corresponding to the input signal in response to the allocate memory signal to form allocated memory. The client device communicates the data signal corresponding to the input signal to the server device. The server device stores data from the data signal in the allocated memory and communicates a response to the client device based on the data signal.

42 Claims, 7 Drawing Sheets

(51) Int. Cl.
*H04N 21/658* (2011.01)
*H04L 29/06* (2006.01)
*H04N 21/233* (2011.01)
*H04N 21/234* (2011.01)

(52) U.S. Cl.
CPC . *H04N 21/23418* (2013.01); *H04N 21/47202* (2013.01); *H04N 21/6582* (2013.01)

(56) References Cited

U.S. PATENT DOCUMENTS

2014/0068789 A1* 3/2014 Watts .................... H04W 12/08
  726/29
2014/0098240 A1* 4/2014 Dimitriadis ...... H04N 21/42203
  348/169
2014/0173440 A1* 6/2014 Dal Mutto .............. G06F 3/017
  715/728

* cited by examiner

METHOD AND SYSTEM FOR COMMUNICATING FROM A CLIENT DEVICE TO A SERVER DEVICE IN A CENTRALIZED CONTENT DISTRIBUTION SYSTEM

TECHNICAL FIELD

The present disclosure relates generally communicating between a server and a client device, and, more specifically, to communicating input commands from the client device to the server device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Many content providers are offering systems that provide a centralized server with a large video storage device therein. Multiple clients are connected to the server to allow video content to be displayed at a display device associated with the server. Typically, the client device is controlled using an infrared remote control device that sends a key command from the client to the server based upon buttons selected by the user. These commands are small bitwise and are acted upon immediately by the server.

Users of content processing systems are also familiar with various types of electronic devices. Various types of electronics devices such as iPads®, touchscreen cellular phones and a host of other types of technologies continue to emerge and evolve. These devices offer a wide range of possible uses for controlling a device.

SUMMARY

The present disclosure allows the use of data-rich inputs to a client device to control a server to provide an improved customer experience.

In one aspect of the disclosure, a method includes communicating an audio-video stream and a remote user interface to the client device through the local area network, receiving an input signal at the client device, communicating an allocate memory signal requesting the server device to allocate memory in response to the input signal, allocating, at the server device, memory for receiving data corresponding to the input signal in response to the allocate memory signal to form allocated memory, communicating the data signal corresponding to the input signal from the client device to the server device, storing data from the data signal in the allocated memory, and communicating a response to the client device based on the data signal.

In a further aspect of the disclosure, a system for controlling a communication system includes a local area network, a client device and a server device in communication with the client device through the local area network. The server device communicates an audio-video stream and a remote user interface to the client device through the local area network. The client receives an input signal and optionally communicates an allocate memory signal requesting the server device to allocate memory in response to the input signal. The server device allocates memory for receiving data corresponding to the input signal in response to the allocate memory signal to form allocated memory. The client device communicates the data signal corresponding to the input signal to the server device. The server device stores data from the data signal in the allocated memory and communicates a response to the client device based on the data signal.

In another aspect of the disclosure, a method includes communicating between a client device and a server device through a local area network comprising communicating an audio-video stream and a remote user interface to the client device through the local area network and receiving a visual input signal at the client device, communicates a visual data signal corresponding to the visual input signal from the client device to the server device and communicating a response to the client device based on the visual data signal.

In yet another aspect of the disclosure, a system includes a local area network, a client device and a server device in communication with the client device through the local area network. The server device communicates an audio-video stream and a remote user interface to the client device through the local area network. The client device receives a visual input signal. The client device communicates a visual data signal corresponding to the visual input signal to the server device. The server device communicates a response to the client device based on the visual data signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
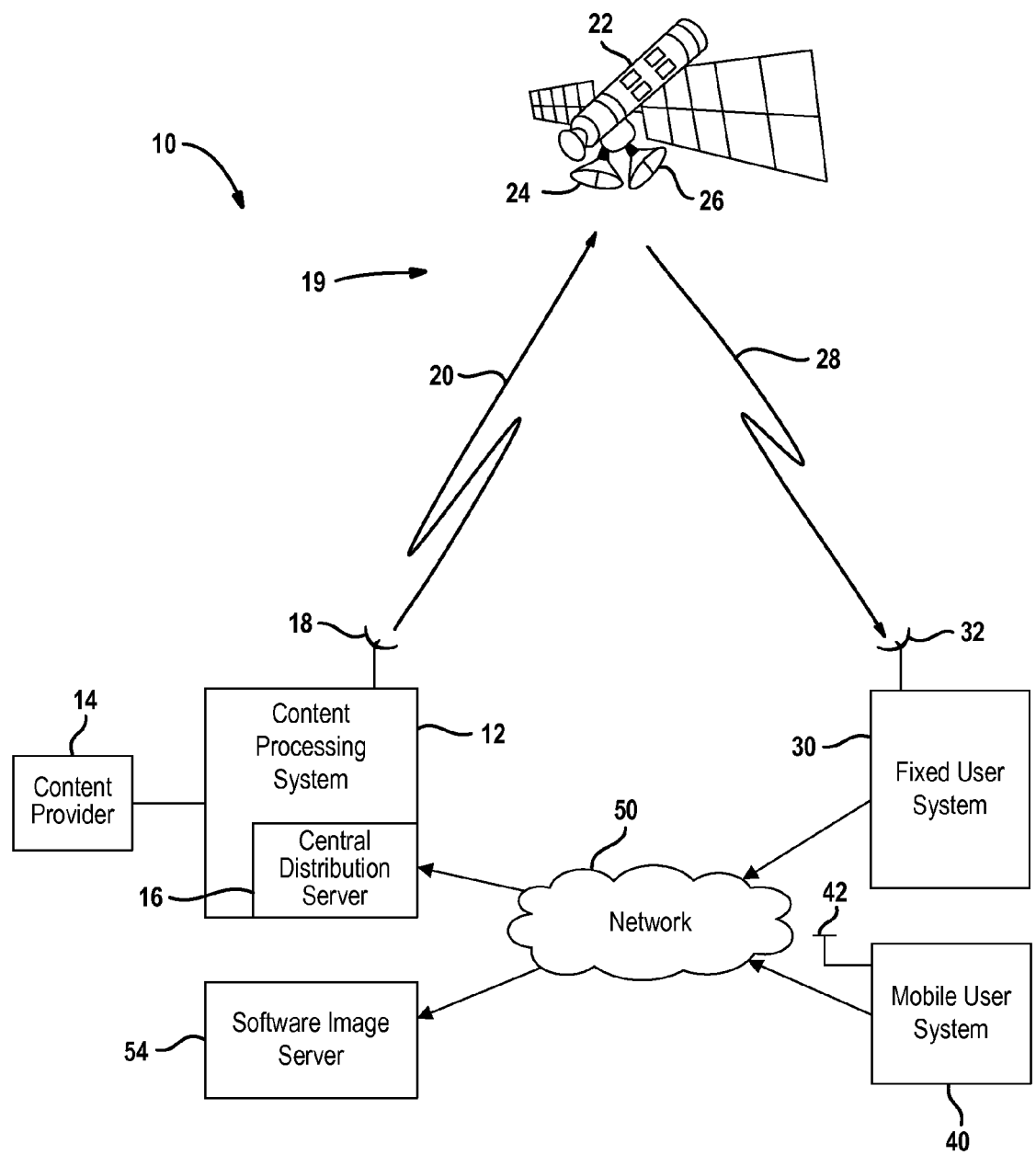
FIG. 1 is a high level block diagrammatic view of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTIVE® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a communication system 10 is illustrated. Communication system 1 includes a content processing system 12 that is used as a processing and transmission source. A plurality of content providers 14, only one of which illustrated, may provide content to the content processing system 12. The content processing system 12 receives various types of content from a content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution including resetting a user device, providing a software image or providing an updated software image to a user device. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network or a combination thereof. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40. The network 50 may also be in communication with the software image server 54. The software image server 54 may include memory for storing software images for the fixed user system 30 or the mobile user system 40. The software image server 54 may include boot software images or other software images. The software images may be initial software images or revised software images. The software images within the software image server 54 may also be different versions of software images. The fixed user system 30 and the mobile user system 40 use various data versions of software for testing. The software image server 54 may be incorporated into the content processing system 12 or a separate component or data site that may interconnect to the other parts of the system 10 through the network 50.

Figure 2:
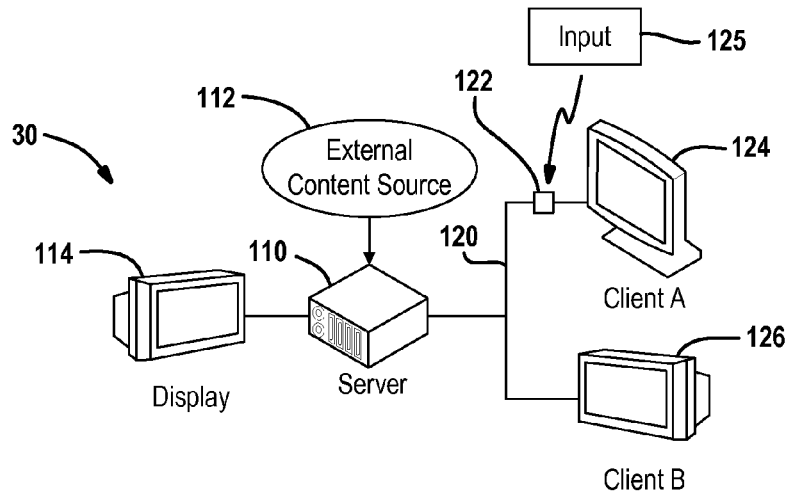
FIG. 2 is a block diagrammatic view of a first network topology.

Referring now to FIG. 2, one example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The server device 110 may communicate with a first client. Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

The client device 122 may receive signals from an input 125. The input 125 may be various types of devices such as a tablet computer, a cellular phone or the like. The input provides an input command indicative of the user wanting to control a function of the client or server. The input may also be a person generating an audio signal comprising a voice signal with spoken words. The input signals from the input 125 may be in a variety of forms including RF, optical signals, a voice signal or the like. Examples of an input type include an audio input signals, a graphical input signal, a gesture signal such as a performing a swipe command on a touch screen of an input device used for the input 125, a pointing device signal such as a mouse or stylus or another type of graphical input.

Ultimately, the input 125 provides a signal to the client device 122. The client device 122 converts the input 125 to data which is communicated to the server 110. The server 110 generates a response to the client. The response may be a changes video input or a changed remote user interface.

The input 125 could provide a relatively large amount of data compared to a standard infrared remote control. For the server to receive the relatively large amount of data, memory in the server optionally could be allocated, at least temporarily, for receiving the data so that the data may be processed therefrom. It is also possible that the server has set aside a dedicated amount of memory for receiving the data such that specific memory allocation commands are not necessary.

A second client, Client B, may also be in communication with the server 110 through the local area network 120. Client B may contain an internal client device, not shown, for displaying rendered signals on the display. The internal client device may be functionally equivalent to the standalone client device 122. Because both the first client, Client A, and the second client, Client B, are in communication directly with the server 110, the network may be referred to as a closed network. Various numbers of clients may be connected to the local area network 120. The input 125 may also be in direct communication with the Client B 126. That is, the input 125 may be directly input to a display or television. The display or television of Client B 126 may process the signals like the client device 122.

Figure 3:
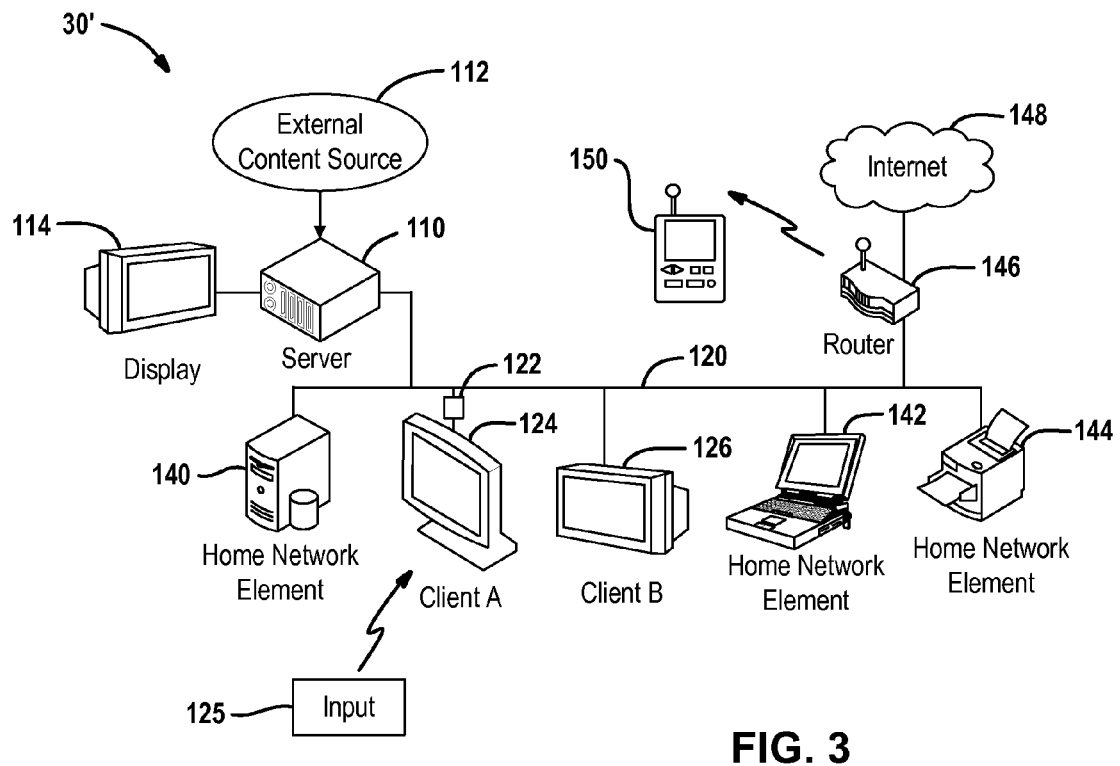
FIG. 3 is a block diagrammatic view of a second example of the network topology.

Referring now to FIG. 3, a fixed user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless device 150 to communicate with at least one server 110 or 140. The wireless device 150 may, for example, be a personal digital assistant, a cellular phone, a personal media device or a Blu-Ray or DVD player. Of course, other wireless devices may be part of the network.

Figure 4:
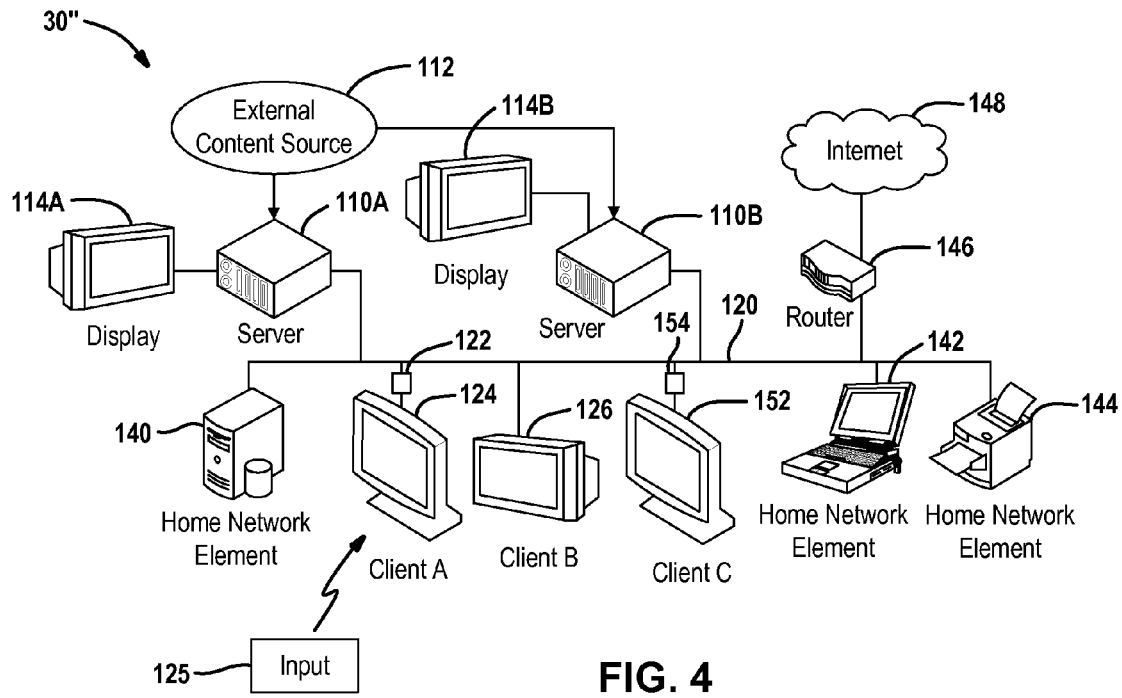
FIG. 4 is a block diagrammatic view of a third example of a network topology.

Referring now to FIG. 4, another example of a fixed user system 30" is illustrated. In this example, the same elements from FIGS. 2 and 3 are provided with the same reference numerals. The local area network 120 may also include two servers 110A and 110B. Each server may include an optional display device 114A, 114B, respectively. In this example a third client, Client C, is illustrated having a display 152 and a client device 154.

Figure 5:
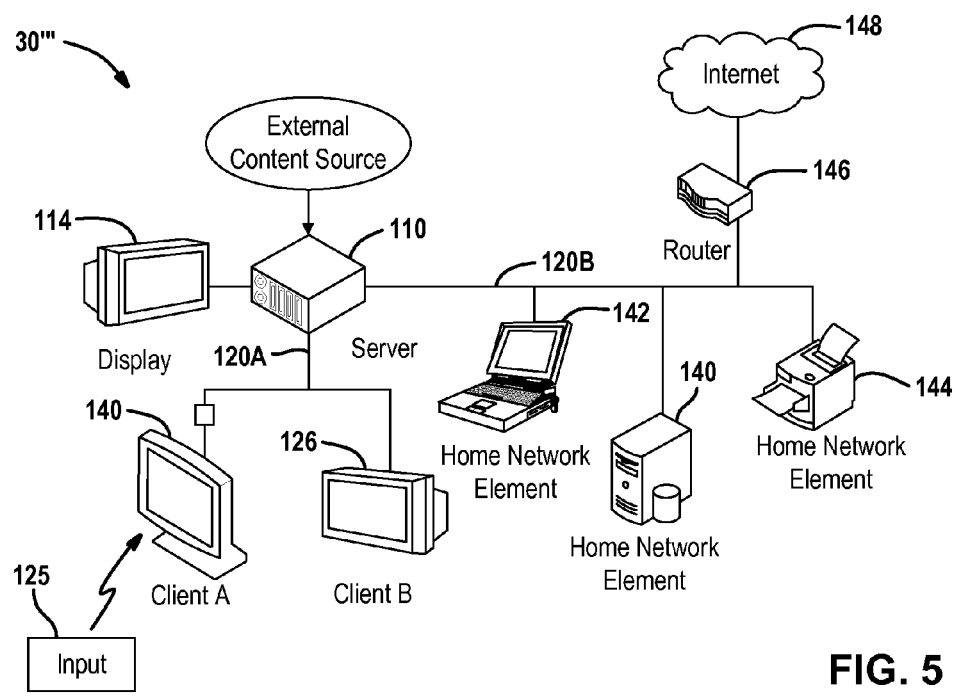
FIG. 5 is a block diagrammatic view of a fourth example of a network topology.

Referring now to FIG. 5, providing customers with reliable service is important. A fourth example of the fixed user system 30" is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the computer 140, the laptop computer 142, the printer 144 and the router 146.

Figure 6:
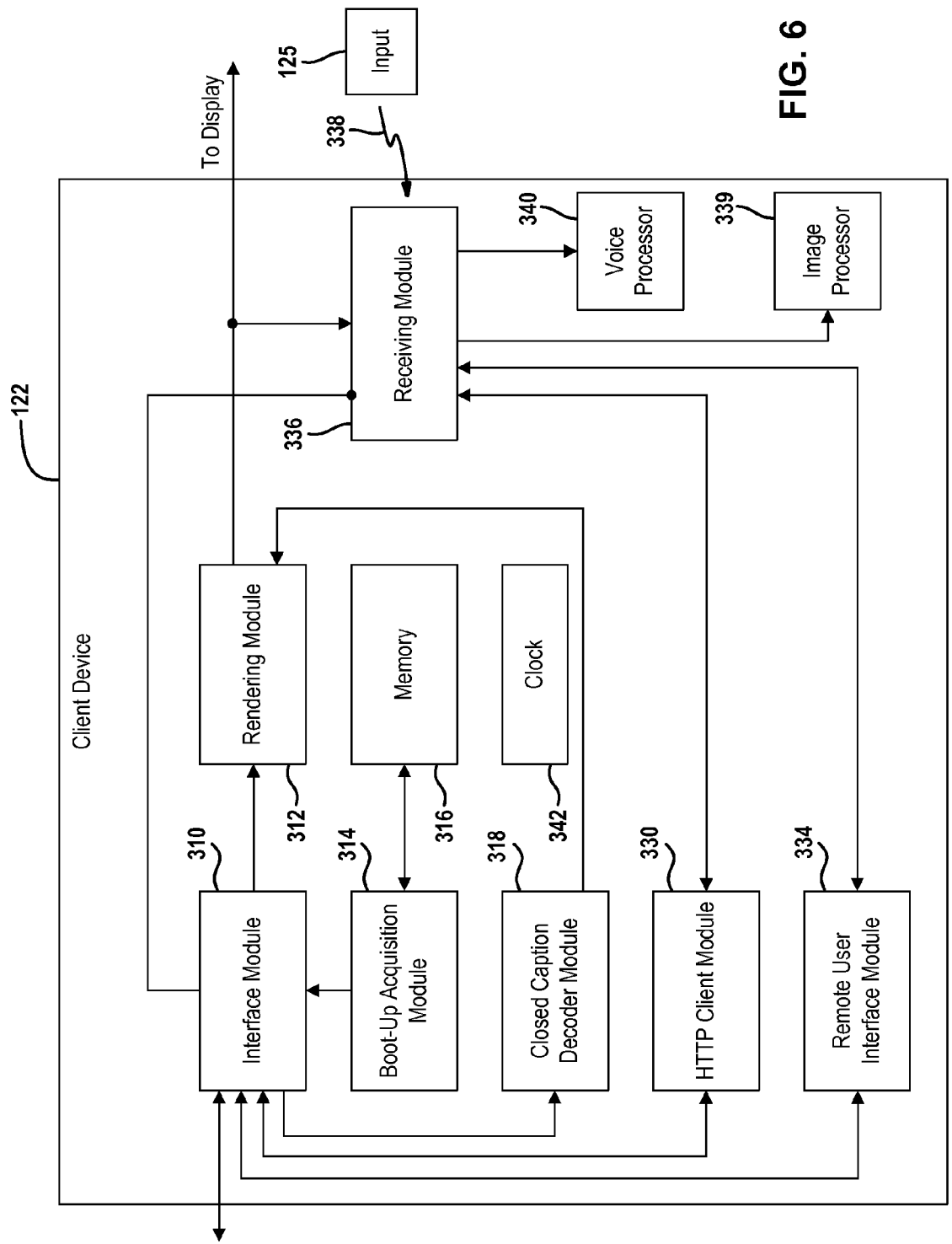
FIG. 6 is a simplified block diagrammatic view of a client device.

Referring now to FIG. 6, a client device 122 is illustrated in further detail. The client device 122 may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate through a local area network to the server 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 communicates with a rendering module 312. The rendering module 312 receives formatted signals through the local area network that are to be displayed on the display. The rendering module 312 merely places pixels in locations as instructed by the formatted signals. Rendering may also take place using vector graphics commands that instruct a group of pixels to be formed by the client based on simple instructions. By not including a decoder, the rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlaid upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control or input 125 (FIGS. 2-6) through input 338 associated with the display and convert them to a form usable by the remote user interface module 334. The remote user interface module 334 allows the server to send graphics and audio and video to provide a full featured user interface within the client. Screen displays may be generated based on the signals from the server. Thus, the remote user interface module 334 may also receive data through the interface module 310. It should be noted that modules such as the rendering module 312 and the remote user interface module 334 may communicate and render both audio and visual signals.

The receiving module 336 may receive input signals from the input 125 illustrated in FIGS. 2-5. The input may be a visual input signal that may include, but is not limited to, a graphical input signal such as a stylus signal or a gesture signal, a mouse signal, or a pointer signal. Each visual input signal may include a relatively large amount of data compared to a standard button signal from a remote control. The gesture signal may be on a screen or in front of a camera associated with the client device. Each signal may consist of a sequence of numerous sub-signals such as a sequence of multiple point and time positions representing the motion a user makes as an input signal. A graphical input signal might also consist of an image of sequence of images taken from a cell phone camera. An image processor 339 may be coupled to the receiving module 336. The image processor 339 processes the visual input signal to determine a desired control signal to be sent to the server as a data signal. For example, an image of a face may unlock or reconfigure a client device. A face image may be used to configure setting of a set top box or server associated with a user.

A voice signal may also be received through the input 338 to the receiving module 336. A voice processor 340 in communication with the receiving module 336 may process or recognize the audio signal and convert the audio voice signal into a text file. Ultimately, the inputs to the receiving module 336 may be communicated through the interface module 310 to the server device.

The data received through the receiving module 336 may be communicated directly to the interface module 310 and ultimately the server with very little processing because very little processing power may be included within a client device 122. The receiving module 336 may convert the signals input into electrical signals for transmission or communication to the server. For example, the raw voice signals may be communicated to the server device through the interface module 310. The raw voice signal may be essentially be recorded voice signals with no voice recognition applied thereto.

A clock 342 may communicate with various devices within the system so that the signals and the communications between the server and client are synchronized and controlled.

Figure 7:
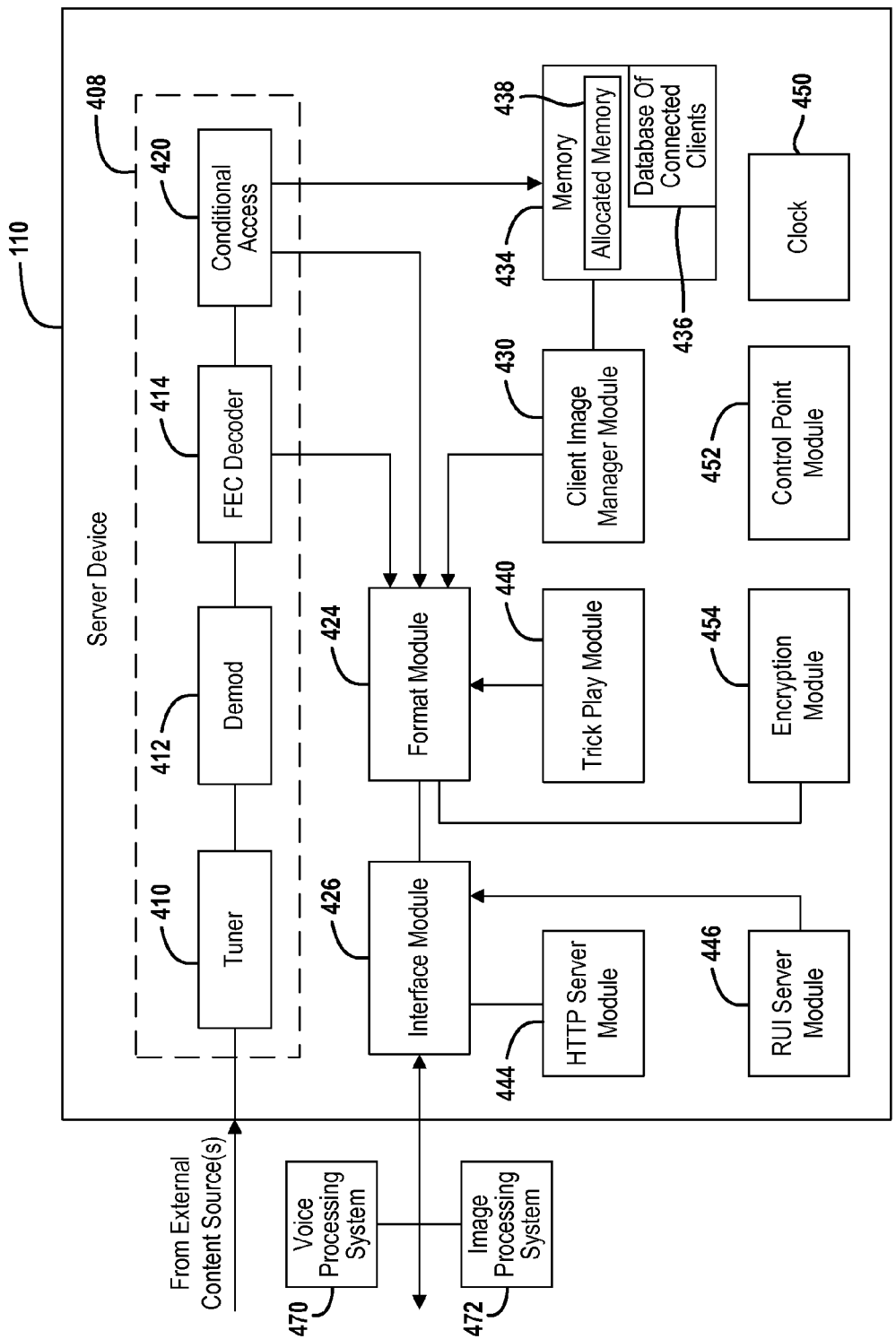
FIG. 7 is a block diagrammatic view of a server device.

Referring now to FIG. 7, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module 424 may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate comments to control pixels at different locations of the display.

The interface module 426 may be used for receiving input from the client device. For example, the network interface module 426 may receive various types of input data signals communicated from various input devices to the client devices. The data received through the network interface module may include data from a mouse, from a stylus or pointer device, a voice command, or other type of graphical or gesture command.

The network interface module 426 may also communicate with the internet. In the present example, when a voice signal or visual signal is provided the voice signal or visual input signal may be communicated to an external device such as a voice processing system 470 or image processing system 472 to perform voice recognition and return a text signal or command signal to the network interface module 426. The voice processing system 470 and the image processing system 472 may also be included within the server device as well.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory 434 may also contain other data such as a database of connected clients 436. The database of connected clients may also include the client image manager module data.

The memory 434 may also include an allocated memory 438. The allocated memory 438 may also be referred to as a buffer. The allocated memory 438 may vary in size. The memory for the allocated memory 438 is reserved or allocated based on allocate memory commands from the client device as described below.

A trick play module 440 may also be included within the server device 110. The trick play module 440 may allow the server device 110 to provide renderable formatted signals from the format module 424 in a format to allow trick play such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used as a controller to control and supervise the various functions provided above within the server device. The functions may ultimately include, but are not limited to, storing the command data in the allocated memory 438, processing the data to determine what response is desired for the data and generating a response signal to the client.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

An encryption module 454 may also be incorporated into the server device 110 for encrypting the output of the server 110. The encryption module 454 may also provide digital transmission content protection (DTCP) to copy protected content.

Figure 8:
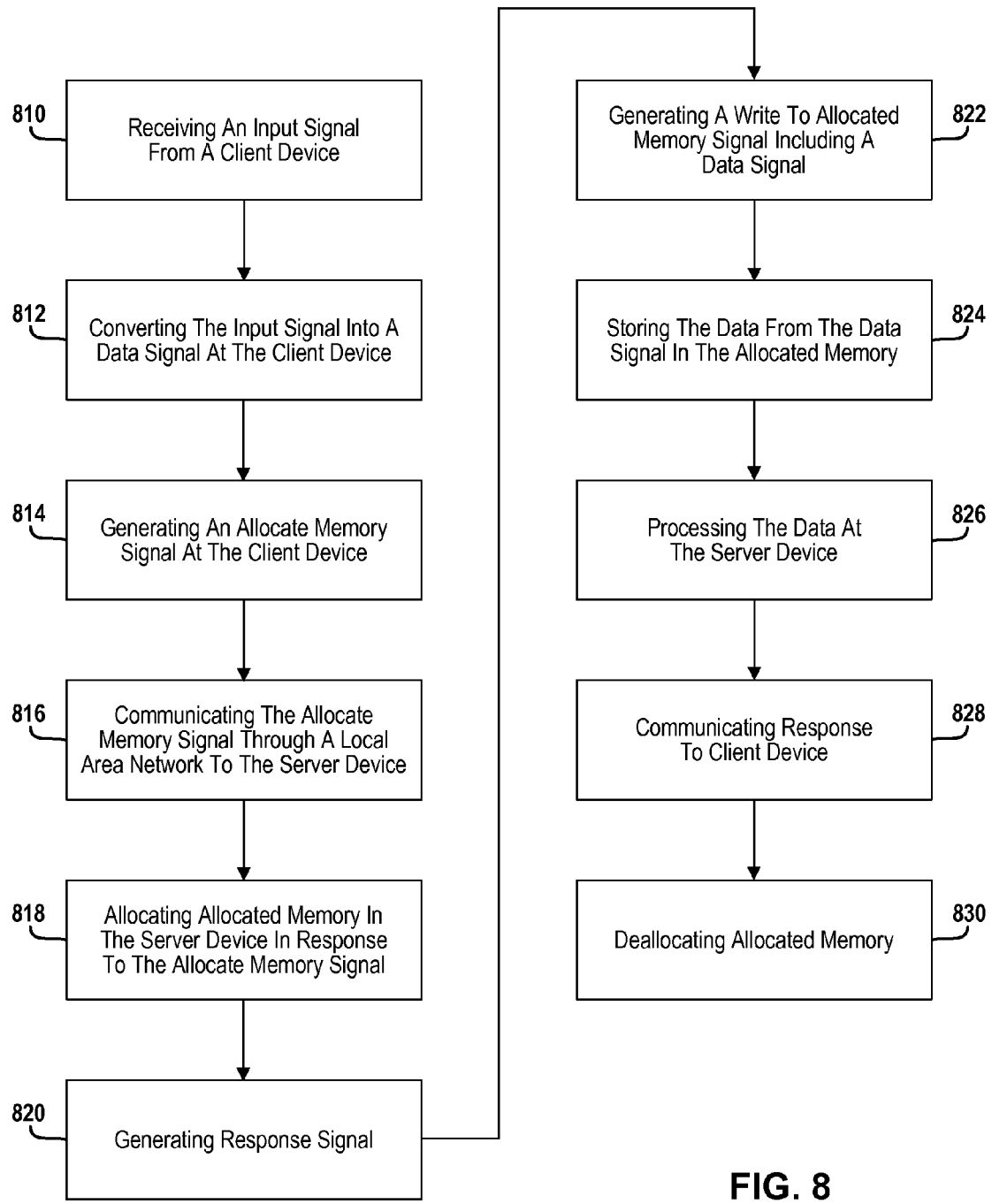
FIG. 8 is a flowchart of a method for communicating data from a client to a server.

Referring now to FIG. 8, a method for operating a system is set forth. In step 810 an input signal is received at a client device. The input signal is received from the input 125 described above with respect to FIGS. 2-5. The input 125 may be a device. The input signal may consist of an RF signal such as a Bluetooth or Wi-Fi signal. The input signal may also be an infrared signal. The input may also be received from a user such as a voice command in an audible form. The input signal may also refer to a gesture performed on the input device such as a swipe. The input signal may also be a graphical input signal. The input signal is a data rich signal compared to a conventional remote control signal.

In step 812, the input signal is converted into an electrical data signal. In the case of a voice command, the voice command may be converted into an electrical data signal such as a digital or analog signal by a transducer or the like. In the case of receiving an RF signal, the input signal is converted into a different format, such as an electrical signal within the client device so it can be communicated to the server.

Figure 9:
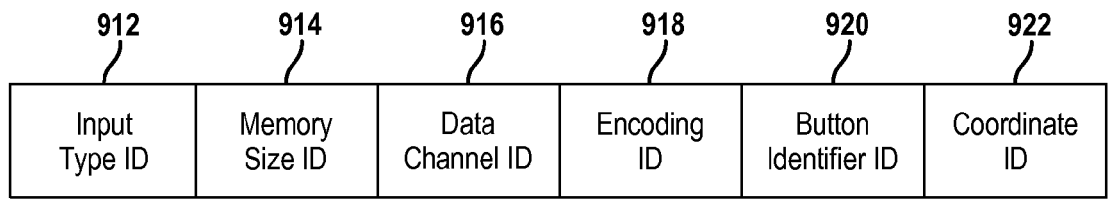
FIG. 9 is a diagrammatic representation of the parts of an allocate memory signal.

Referring now also to FIG. 9, in step 814 an allocate memory signal 910 is generated at the client device in response to the input signal. The allocate memory signal 910 may have many components or identifiers depending upon the type of input signal. For example, an input type identifier 912 may be communicated in the allocate memory signal. The input type identifier 912 may correspond to an audio input, a graphical input, a voice command input, a pointer movement signal, a pointer button, a swipe command or the like. Alphanumeric identifiers may be used for the different types of identifiers. The allocate memory signal may also include a memory size identifier 914 corresponding to the amount or size of memory required to store the data signal. The allocate memory signal may also include a data channel identifier 916 identifying the channel number used for communicating between the client device and the server device. Various numbers of channels may be established between the client and server for various types of data. An encoding identifier 918 may also be included in the allocate memory signal. The encoding identifier may, for example, correspond to the type of encoding used for the data. In an audio input signal, the type of encoding may correspond to PCM audio. A graphical input may correspond to PNG pixel data as well.

The allocate memory signal 910 may also include a button identifier 920 corresponding to a particular type of button. The button identifier 920 may be used alone or together with a coordinate identifier 922. The coordinate identifier 922 identifies a coordinate of the position of an on-screen cursor or visual marker.

Referring now to step 816, the allocate memory signal is communicated through the local area network to the server device. In step 818, memory in the server is allocated by the server device in response to the allocate memory signal to form allocated memory. As mentioned above, the allocate memory signal has various types of data that is used by the server in allocating the proper amount and type of memory.

In step 820, an optional response signal may be communicated from the server device to the client device to inform the client device the memory has been allocated. The response signal may be referred to as a confirmation signal.

In step 822, a write to allocated memory signal may include the data from the data signal of step 812. The write to allocated memory signal is communicated through the local area network from the client device to the server device. It should be noted that in this example, the write to allocated memory signal and the allocate memory signal are two different steps. However, these signals may be combined in the same signal so that the memory is allocated and the data is also provided with one allocate and write signal communicated between the client device and the server device. The server device may already have a pool of memory dedicated for the reception of such large data. In this case, the allocate signal could be ignored by the server and the write signal be processed. In step 824, the data from the data signal is stored in the allocated memory of the server device.

In step 826, the server device processes the data. The data may be processed in various ways and may elicit various responses from the server device. For example, in step 828 a response signal is communicated from the server device to the client device. A response may include a remote user interface or a changed remote interface, channel data or the like. In step 830 once the processing of the data signal has been performed by the server, a de-allocate memory signal for the allocated memory is generated in step 830. This returns the memory (unallocates) to a memory pool for other use.

Figure 10:
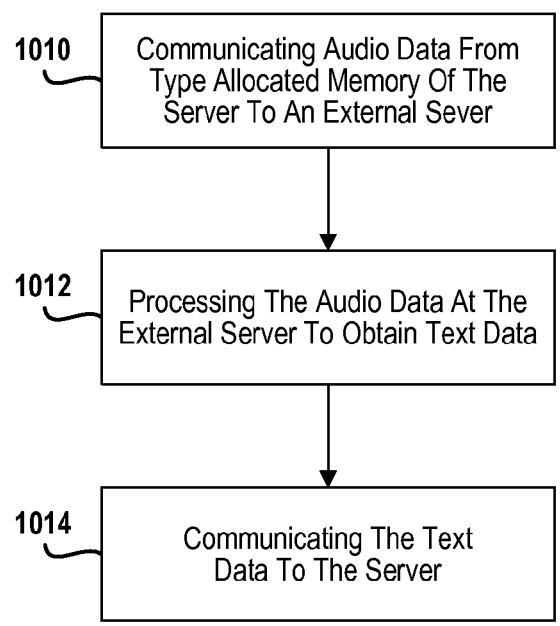
FIG. 10 is a flowchart of a method for processing audio data.

Referring now to FIG. 10, the step of processing described as 826 is FIG. 8 may be performed at the server device but may also be performed at an external server. This is applicable to when the data signal is an audio data signal. In step 1010, the audio data from the allocated memory of the server may be communicated to an external server. In step 1012, the audio data at the external server is processed to obtain text data. Voice recognition may be used. Multiple languages may be supported. The external server may provide the latest technology and processing for voice files. In this way, better results may be obtained for the customers. In step 1014, the text data may be communicated to the first server from the external server. The text data corresponds to the original audio file. After step 1014, the response is processed and communicated according to steps 826-830 in FIG. 8. Image processing can be performed in an analogous process with an external server providing dedicated image processing service and returning processed data regarding the image transferred to it.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a local area network;
   a client device;
   a server device in communication with the client device through the local area network; said server device communicates an audio-video stream and a remote user interface to the client device through the local area network;
   said client device receives an input signal and communicates an allocate memory signal requesting the server device to allocate memory in response to the input signal, said allocate memory signal comprising an input signal type identifier corresponding to a type of input signal received at the client device;
   said server device allocates memory for receiving data corresponding to the input signal in response to the allocate memory signal and the input signal type identifier to form allocated memory, said server allocating varying sizes of memory based on different input signal type identifiers;

said client device communicates a data signal corresponding to the input signal type to the server device; and said server device stores data from the data signal in the allocated memory, processes the data of the data signal from the allocated memory and communicates a response to the client device based on the data signal.

2. The system as recited in claim 1 wherein the input signal type identifier comprises a voice signal.

3. The system as recited in claim 1 wherein the input signal type identifier comprises an audio signal.

4. The system as recited in claim 1 wherein the input signal type identifier comprises a graphical input signal.

5. The system as recited in claim 1 wherein the input signal type identifier comprises a pointer signal.

6. The system as recited in claim 1 wherein the input signal type identifier comprises a gesture signal.

7. The system as recited in claim 1 further comprising an input device communicating an input data signal to the client device.

8. The system as recited in claim 1 wherein the server device processes the data signal prior to communicating a response to the client device.

9. The system as recited in claim 1 wherein the server communicates a second data signal to an external server for processing.

10. The system as recited in claim 1 wherein the allocate memory signal comprises an input type.

11. The system as recited in claim 1 wherein the allocate memory signal comprises a data size.

12. The system as recited in claim 1 wherein the allocate memory signal comprises an input type and a data size.

13. The system as recited in claim 1 wherein the allocate memory signal comprises a data channel identifier.

14. The system as recited in claim 1 wherein the memory comprises a buffer.

15. The system as recited in claim 1 the allocate memory signal and the data signal are sent together.

16. A method of communicating between a client device and a server device through a local area network comprising:

communicating an audio-video stream and a remote user interface to the device through the local area network;

receiving an input signal at the client device;

communicating by the client device an allocate memory signal requesting the server device to allocate memory in response to the input signal, said allocate memory signal comprising an input signal type identifier corresponding to a type of input signal received at the client device;

allocating, at the server device, memory for receiving data corresponding to the input signal in response to the allocate memory signal and the input signal type identifier, said server allocating varying sizes of memory based on different input signal type identifiers;

communicating a data signal corresponding to the input signal from the client device to the server device;

storing data from the data signal in the allocated memory and processing the data of the data signal from the allocated memory; and communicating a response from the server device to the client device based on processing of the data signal.

17. The method as recited in claim 16 wherein receiving the input signal comprises receiving a voice signal.

18. The method as recited in claim 16 wherein receiving the input signal comprises receiving an audio signal.

19. The method as recited in claim 16 wherein receiving the input signal comprises receiving a graphical input signal.

20. The method as recited in claim 16 wherein receiving the input signal comprises receiving a pointer signal.

21. The method as recited in claim 16 wherein receiving the input signal comprises receiving the input signal from an input device.

22. The method as recited in claim 16 further comprising processing the data signal at the server device prior to communicating a response to the client device.

23. The method as recited in claim 16 further comprising communicating a second data signal to an external server for processing.

24. The method as recited in claim 16 wherein communicating the allocate memory signal comprises communicating an input type.

25. The method as recited in claim 16 wherein communicating the allocate memory signal comprises communicating a data size.

26. The method as recited in claim 16 wherein communicating the allocate memory signal comprises communicating an input type and a data size.

27. The method as recited in claim 16 wherein communicating the allocate memory signal comprises communicating a data channel identifier.

28. The method as recited in claim 16 wherein allocating memory comprises allocating a buffer.

29. The method as recited in claim 16 further comprising sending the allocate memory signal and the data signal together.

30. A system comprising:

a local area network;

a client device;

a server device in communication with the client device through the local area network, said server device communicates an audio-video stream and a remote user interface to the client device through the local area network;

said client device receives a visual input signal that corresponds to a visual input signal type;

said client device communicating to the server device an allocate memory signal based on the visual input signal type to form allocated memory, said server allocating varying sizes of memory based on different visual input signal type identifiers;

said server device allocating memory for receiving data corresponding to the visual input signal type based on the visual input signal type;

said client device communicates a visual data signal corresponding to the visual input signal type to the server device; and said server device with stored data of the visual data signal in the allocated memory communicates a response to the client device based on the visual data signal.

31. The system as recited in claim 30 wherein the visual input signal type comprises a graphical input signal.

32. The system as recited in claim 30 wherein the visual input signal type comprises a pointer signal.

33. The system as recited in claim 30 wherein the visual input signal type comprises a gesture signal.

34. The system as recited in claim 30 further comprising an input device communicating an input data signal to the client device.

35. The system as recited in claim 30 wherein the server device processes the data signal prior to communicating a response to the client device.

36. The system as recited in claim 30 wherein the server communicates a second data signal to an external server for processing.

37. A method of communicating between a client device and a server device through a local area network comprising:
- communicating an audio-video stream and a remote user interface to the client device through the local area network;
- receiving a visual input signal at the client device that corresponds to a visual input signal type;
- communicating an allocate memory signal from the client device to the server device based on the visual input signal type to form allocated memory, said server allocating varying sizes of memory based on different visual input signal type identifiers;
- allocating, at the server device, memory for receiving data corresponding to the visual input signal type based on the visual input signal type;
- communicating a visual data signal corresponding to the visual input signal type from the client device to the server device;
- storing data of the visual data signal in the allocated memory; and
- communicating a response from the server device to the client device based on the visual data signal, wherein processing of the visual data signal at the server device occurs prior to communicating the response to the client device.

38. The method as recited in claim 37 wherein receiving the visual input signal type comprises receiving a graphical input signal.

39. The method as recited in claim 37 wherein receiving the visual input signal type comprises receiving a pointer signal.

40. The method as recited in claim 37 wherein receiving the visual input signal type comprises receiving the input signal from an input device.

41. The method as recited in claim 37 wherein receiving the visual input signal type comprises receiving a gesture signal.

42. The method as recited in claim 37 further comprising communicating a second data signal to an external server for processing.

* * * * *